(12) United States Patent
Liu (10) Patent No.: US 11,729,019 B1
(45) Date of Patent: Aug. 15, 2023

(54) SYSTEMS AND METHODS FOR SCHEDULING PERIODIC MESSAGE TRANSMISSION

(71) Applicant: GM GLOBAL TECHNOLOGY OPERATIONS LLC, Detroit, MI (US)

(72) Inventor: Chang Liu, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/938,172

(22) Filed: Oct. 5, 2022

(51) Int. Cl.
*H04L 12/40* (2006.01)
(52) U.S. Cl.
CPC ........... *H04L 12/40006* (2013.01); *H04L 2012/40215* (2013.01); *H04L 2012/40273* (2013.01)
(58) Field of Classification Search
None
See application file for complete search history.

(56) References Cited

U.S. PATENT DOCUMENTS

| | | | |
|---|---|---|---|
| 2014/0226674 A1* | 8/2014 | Bellagamba | H04L 45/00 370/411 |
| 2018/0070373 A1* | 3/2018 | Muench | H04W 72/52 |
| 2022/0014297 A1* | 1/2022 | Bhatia | H04L 47/50 |
| 2022/0159444 A1* | 5/2022 | Newman | H04W 4/029 |

* cited by examiner

*Primary Examiner* — Angela Nguyen
(74) *Attorney, Agent, or Firm* — Lorenz & Kopf, LLP (57) ABSTRACT

Methods and apparatus are provided for periodic message transmission. Transmission of messages by the apparatus onto a communication bus are enabled during time ticks. The time ticks are separated by tick time intervals. A plurality of periodic messages configured to be transmitted on the communication bus are identified. Each periodic message has a periodicity that is a multiple of the tick time interval. The periodic messages are sorted by increasing periodicities to generate a sequence of periodic messages. A zero-start-up delay is assigned to a first periodic message in the sequence. A start-up delay is generated for each periodic message in the sequence based on a previous start-up delay associated with a previous periodic message, the tick time interval, and a periodicity of that periodic message. A transmission schedule is generated for the periodic messages based on the start-up delay and the periodicity associated with each of the periodic messages.

20 Claims, 3 Drawing Sheets

SYSTEMS AND METHODS FOR SCHEDULING PERIODIC MESSAGE TRANSMISSION

INTRODUCTION

The technical field generally relates to vehicles, and more particularly relates to systems and methods for scheduling periodic message transmission in a vehicle communication system.

A vehicle often relies on communications between electronic control units (ECU) within the vehicle to facilitate different vehicle operations. Each ECU may be communicatively coupled to one or more ECUs within the vehicle via one or more communication buses. Examples of communication buses include, but are not limited to, control area network (CAN) buses and automotive ethernet buses. The transmission of messages on a communication bus typically involves central processing unit (CPU) throughput at an ECU because the messages are often constructed from control signals and status signals. The transmission of secure messages may involve the use of additional CPU handling time to implement cryptographic technologies to generate the secure messages.

An individual ECU may transmit tens or hundreds of messages on a single communication bus. Many of the messages may be periodic messages with associated periodicities. Scheduling the transmission of the periodic messages in accordance with just the periodicity of the periodic messages on a communication bus may lead to instances where multiple messages having a shared periodicity and multiple messages having a periodicity that is a multiple of the periodicity of other messages may be scheduled for transmission at the same time. This may cause a spike in the CPU throughput that could potentially lead to an operating system (OS) task overrun and/or may cause a burst of a communication busload that introduces unexpected transmission delays or timing jitters for other messages that are being transmitted on the same communication bus.

Accordingly, it is desirable to provide improved methods and systems for scheduling the transmission of periodic messages on a communication bus in manner that may alleviate CPU throughput spikes and bursts in communication busload. Furthermore, other desirable features and characteristics will become apparent from the subsequent detailed description and the appended claims, taken in conjunction with the accompanying drawings and the foregoing technical field and background.

SUMMARY

An apparatus is provided for scheduling periodic message transmission. The apparatus includes a processor configured to be communicatively coupled to a communication bus and a memory. The memory includes instructions that upon execution by the processor, cause the processor to: enable transmission of messages on the communication bus during time ticks, wherein each successive time tick is separated by a tick time interval; identify a plurality of periodic messages configured to be transmitted on the communication bus wherein, each of the plurality of periodic messages is associated with a periodicity, the periodicity being a multiple of the tick time interval; sort the plurality of periodic messages by increasing periodicities to generate a sequence of periodic messages; assign a zero-start-up delay to a first periodic message in the sequence of periodic messages; generate a start-up delay for each periodic message in the sequence of periodic messages based on a previous start-up delay associated with a previous periodic message, the tick time interval, and a periodicity of that periodic message; and generate a transmission schedule for the plurality of periodic messages in accordance with the start-up delay and the periodicity associated with each of the plurality of periodic messages.

In an embodiment, the memory includes further instructions that upon execution by the processor, cause the processor to generate the transmission schedule during a software initialization phase.

In an embodiment, the memory includes further instructions that upon execution by the processor, cause the processor to transmit the plurality of periodic messages onto the communication bus in accordance with the transmission schedule.

In an embodiment, the memory includes further instructions that upon execution by the processor, cause the processor to transmit the plurality of periodic messages onto the communication bus in accordance with the transmission schedule during a run time phase.

In an embodiment, the memory includes further instructions that upon execution by the processor, cause the processor to: identify a second periodic message having a first priority scheduled for transmission during a first time tick; identify a third periodic message having a second priority scheduled for transmission during the first time tick, the second priority being lower than the first priority; and transmit the second periodic message prior to the third periodic message during the first time tick.

In an embodiment, the processor is configured to be communicatively coupled to one of a control area network (CAN) communication bus and an automotive ethernet communication bus.

In an embodiment, the memory includes further instructions that upon execution by the processor, cause the processor to transmit a trigger event message generated in response to a trigger event during a first time tick following the trigger event.

In an embodiment, the memory includes further instructions that upon execution by the processor, cause the processor to transmit the plurality of periodic messages to at least one electronic controller unit (ECU) in a vehicle via the communication bus.

In an embodiment, the memory includes further instructions that upon execution by the processor, cause the processor to: identify a first start-up delay associated with a second periodic message in the sequence of periodic messages; generate a sum of the first start-up delay and the tick time interval; apply a modulo operation to the sum by dividing the sum by a periodicity of a third periodic message following the second periodic message in the sequence of periodic messages to generate a remainder; and assign the remainder as a second start-up delay to the third periodic message.

A method is provided for scheduling periodic message transmission. In one embodiment, the method includes enabling transmission of messages on a communication bus from a controller at a vehicle during time ticks, wherein each successive time tick is separated by a tick time interval; identifying a plurality of periodic messages configured to be transmitted on the communication bus at the controller wherein, each of the plurality of periodic messages is associated with a periodicity, the periodicity being a multiple of the tick time interval; sorting the plurality of periodic messages by increasing periodicities to generate a sequence of periodic messages at the controller; assigning a zero-startup delay to a first periodic message in the sequence of periodic messages at the controller; generating a start-up delay for each periodic message in the sequence of periodic messages based on a previous start-up delay associated with a previous periodic message, the tick time interval, and the periodicity of that periodic message at the controller; and generating a transmission schedule for the plurality of periodic messages in accordance with the start-up delay and the periodicity associated with each of the plurality of periodic messages at the controller.

In an embodiment, the method further includes generating the transmission schedule for the plurality of periodic messages during a software initialization phase at the controller.

In an embodiment, the method further includes transmitting the plurality of periodic messages from the controller via the communication bus in accordance with the transmission schedule.

In an embodiment, the method further includes transmitting each of the plurality of periodic messages from the controller via the communication bus in accordance with the transmission schedule during a run time phase.

In an embodiment, the method further includes: identifying a second periodic message having a first priority scheduled for transmission during a first time tick at the controller; identifying a third periodic message having a second priority scheduled for transmission during the first time tick at the controller, the second priority being lower than the first priority; and transmitting the second periodic message prior to the third periodic message from the controller during the first time tick.

In an embodiment, transmitting messages on the communication bus from the controller comprises further includes transmitting messages on one of a control area network (CAN) communication bus and an automotive ethernet communication bus.

In an embodiment, the method further includes transmitting a trigger event message generated in response to a trigger event during a first time tick following the trigger event from the controller.

In an embodiment, the method further includes transmitting the plurality of periodic messages from the controller to at least one electronic controller unit (ECU) in the vehicle via the communication bus.

In an embodiment, the method further includes: identifying a first start-up delay associated with a second periodic message in the sequence of periodic messages; generating a sum of the first start-up delay and the tick time interval; applying a modulo operation to the sum by dividing the sum by a periodicity of a third periodic message following the second periodic message in the sequence of periodic messages to generate a remainder; and assigning the remainder as a second start-up delay to the third periodic message.

A vehicle including a system for scheduling periodic message transmission is provided. The system at the vehicle includes a processor configured to be communicatively coupled to a communication bus and a memory. The memory includes instructions that upon execution by the processor, cause the processor to: enable transmission of messages on the communication bus during time ticks, wherein each successive time tick is separated by a tick time interval; identify a plurality of periodic messages configured to be transmitted on the communication bus wherein, each of the plurality of periodic messages is associated with a periodicity, the periodicity being a multiple of the tick time interval; sort the plurality of periodic messages by increasing periodicities to generate a sequence of periodic messages; assign a zero-start-up delay to a first periodic message in the sequence of periodic messages; generate a start-up delay for each periodic message in the sequence of periodic messages based on a previous start-up delay associated with a previous periodic message, the tick time interval, and a periodicity of that periodic message; and generate a transmission schedule for the plurality of periodic messages in accordance with the start-up delay and the periodicity associated with each of the plurality of periodic messages.

In an embodiment, the memory includes further instructions that upon execution by the processor, cause the processor to: identify a first start-up delay associated with a second periodic message in the sequence of periodic messages; generate a sum of the first start-up delay and the tick time interval; apply a modulo operation to the sum by dividing the sum by a periodicity of a third periodic message following the second periodic message in the sequence of periodic messages to generate a remainder; and assign the remainder as a second start-up delay to the third periodic message.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
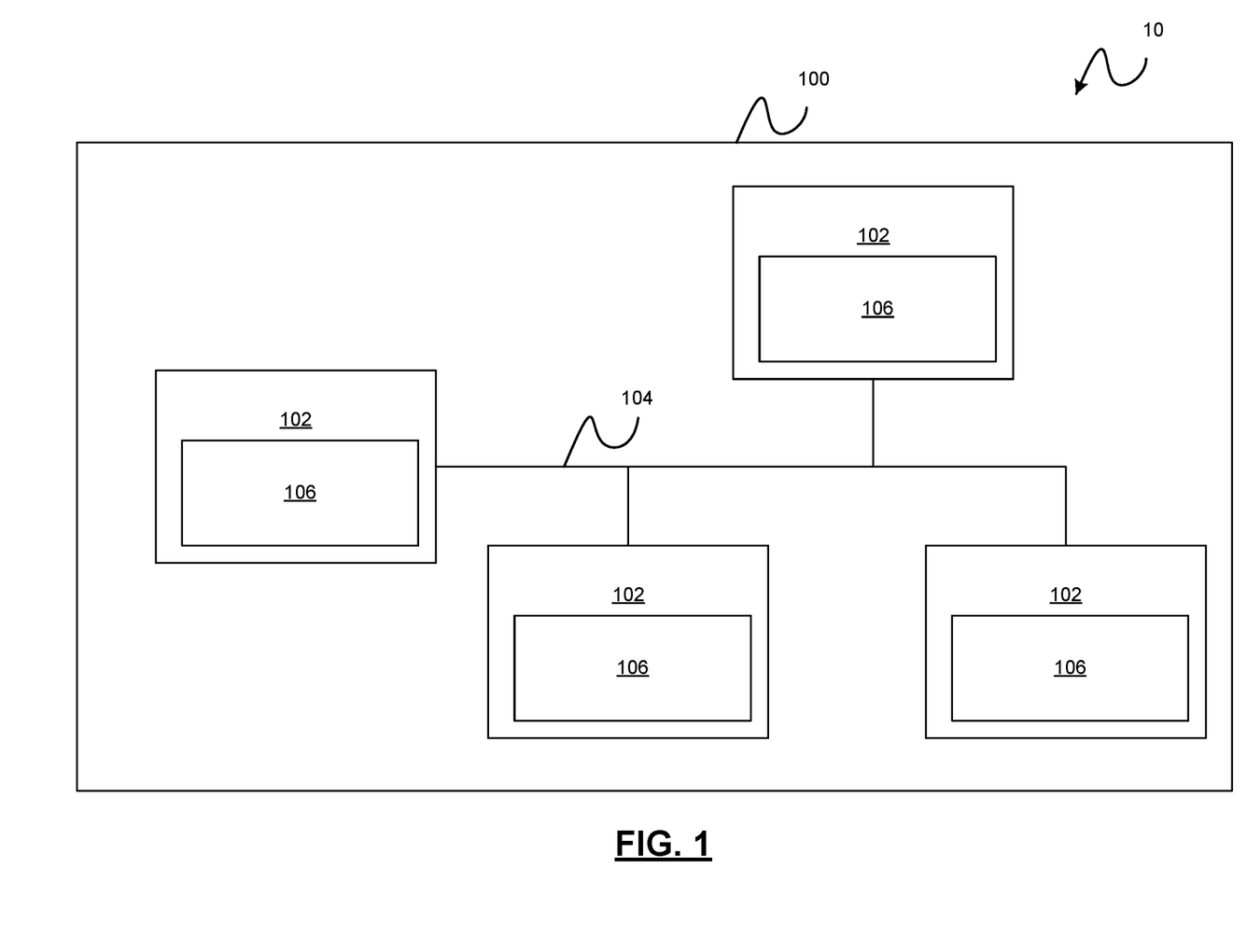
FIG. 1 is a functional block diagram illustrating a vehicle including a vehicle communication network configured to implement periodic message transmission in accordance with an embodiment.

Referring to FIG. 1, a functional block diagram illustrating a vehicle 10 including a vehicle communication network 100 configured to implement periodic message transmission in accordance with an embodiment is shown. The vehicle communication network 100 includes a plurality of electronic control units (ECUs) 102 communicatively coupled to a communication bus 104. In an embodiment, the communication bus 104 is an arbitration-based communication bus. Examples of arbitration-based communication buses include, but are not limited, to a control area network (CAN) communication bus and an automotive ethernet communication bus.

In an embodiment, each ECU 102 includes a periodic message transmission system 106. The periodic message transmission system 106 at an ECU 102 is configured to generate a schedule for the transmission of periodic messages from that ECU 102 to one or more other ECUs 102 during a software initialization phase. The software initialization phase occurs during an initial powering up of a vehicle. The periodic message transmission system 106 at the ECU 102 is configured to transmit the periodic messages generated at that ECU 102 to one or more other ECUs 102 in accordance with the generated transmission schedule during a run time phase. The run time phase occurs during routine operation of the vehicle following the initialization phase.

While all of the ECUs 102 in the vehicle communication network 100 are shown as including an embodiment of the periodic message transmission system 106, in alternative embodiments, some of the ECUs 102 in a vehicle communication network 100 may include an embodiment of the periodic message transmission system 106 while other ECUs 102 may not. While four ECUs 102 are shown as components of the vehicle communication network 100, in alternative embodiments, the vehicle communication network 100 may include a fewer or greater number of ECUs 102. While each ECU 102 is shown as being communicatively coupled to a single vehicle communication network 100, in alternative embodiments an ECU 102 may be communicatively coupled to multiple different vehicle communication networks via different communication buses in a vehicle. The periodic message transmission system 106 may be configured to manage periodic message transmissions by the ECU 102 on one or more of the different vehicle communication networks.

Figure 2:
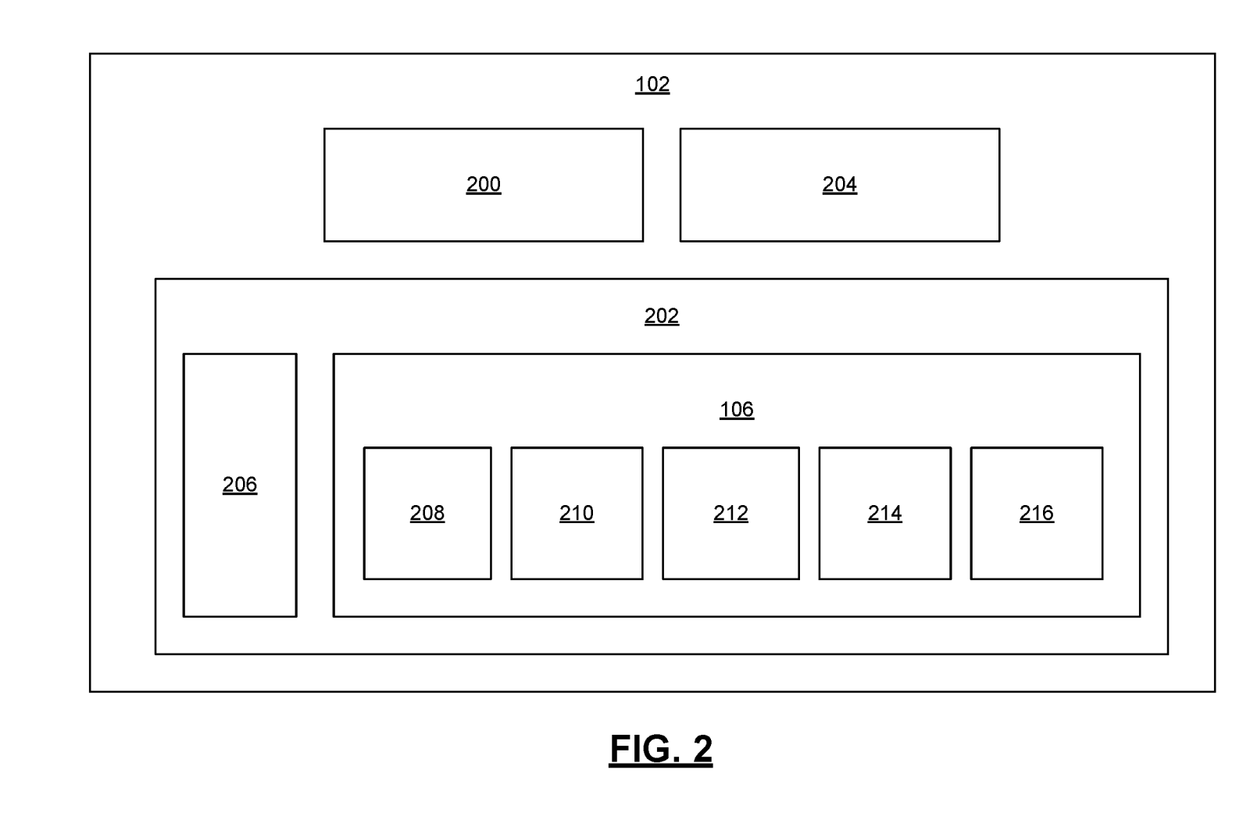
FIG. 2 is a functional block diagram illustrating an ECU including a periodic message transmission system in accordance with an embodiment.

Referring to FIG. 2, a functional block diagram illustrating an ECU 102 including a periodic message transmission system 106 in accordance with an embodiment is shown. The ECU 102 includes a processor 200, a memory 202, and a bus interface 204. The processor 200 is a programable device that includes one or more instructions stored in or associated with the memory 202. The memory 202 includes instructions that the processor 200 is configured to execute. The processor 200 is configured to be communicatively coupled to the communication bus 104 via the bus interface 204. In an embodiment, an operating system module 206 and an embodiment of the periodic message transmission system 106 are stored in the memory 202 as applications. The memory 202 may include other applications that facilitate operation of the ECU 102. The ECU 102 may include additional components that facilitate operation of the ECU 102.

The operating system module 206 is configured to transmit messages onto the communication bus 104 during time ticks. The time ticks are separated by a tick time interval. In an embodiment, the periodic message transmission system 106 includes a message identifier module 208, a sequence generator module 210, a delay generator module 212, a schedule generator module 214, and a message transmitter module 216. In alternative embodiments, the periodic message transmission system 106 may include additional components that facilitate operation of the periodic message transmission system 106.

The message identifier module 208 is configured to identify periodic messages that are generated by the ECU 102 for transmission to one or more other ECUs 102 in the vehicle communication network 100 via the communication bus 104. Each periodic message is associated with a periodicity. Each periodicity is a multiple of the tick time interval. The sequence generator module 210 is configured to sort the identified periodic messages by increasing periodicity to generate a sequence of the periodic messages. In an embodiment, the sequence generator module 210 is configured to sort the periodic messages to generate the sequence of periodic messages using a bubble sort algorithm.

The delay generator module 212 is configured to generate a start-up delay for each of the periodic messages. The delay generator module 212 is configured to assign a zero-start-up delay to the first periodic message in the sequence of periodic messages. The delay generator module 212 is configured to generate a start-up delay for each remaining periodic message in the sequence of periodic messages where the start-up delay is based on a start-up delay of a previous periodic message in the sequence of periodic messages, the tick time interval, and the periodicity of that periodic message. In an embodiment, the delay generator module 212 is configured to calculate the start-up delay for a periodic message by adding the start-up delay of a previous periodic message in the sequence of periodic messages to the time tick interval and then performing a module operation (also known as a remainder operation) on the result using the periodicity of the periodic message. A modulo or remainder operator returns the remainder following the division of the sum of the start-up delay of the previous periodic message and the tick time interval by the periodicity of the periodic message.

The schedule generator module 214 is configured to generate a transmission schedule for the periodic messages in the sequence of periodic messages in accordance with the start-up delay and the periodicity associated with each of the periodic messages in the sequence of periodic messages.

The message transmitter module 216 is configured to coordinate the transmission of the periodic messages in the sequence of periodic messages onto the communication bus 104 via the bus interface 204 in accordance with the transmission schedule generated by the schedule generator module 214. In an embodiment, if the message transmitter module 216 identifies two or more periodic messages scheduled for transmission during the same time tick, the message transmitter module 216 is configured to determine the priorities associated with each of the identified periodic messages and transmit the periodic messages in accordance with the associated priority. For example, if a first periodic message having a first priority and a second periodic message having a second priority are scheduled to be transmitted during the same time tick, and the first priority is higher than the second priority, the first periodic message is transmitted prior to the second periodic message. In an embodiment, the message transmitter module 216 is configured to receive trigger event messages generated at the ECU 102 for transmission on the communication bus 104 and transmit the received trigger event messages during the next transmission tick following receipt of the trigger event messages. In other words, a start-up delay is not applied to trigger event messages.

Figure 3:
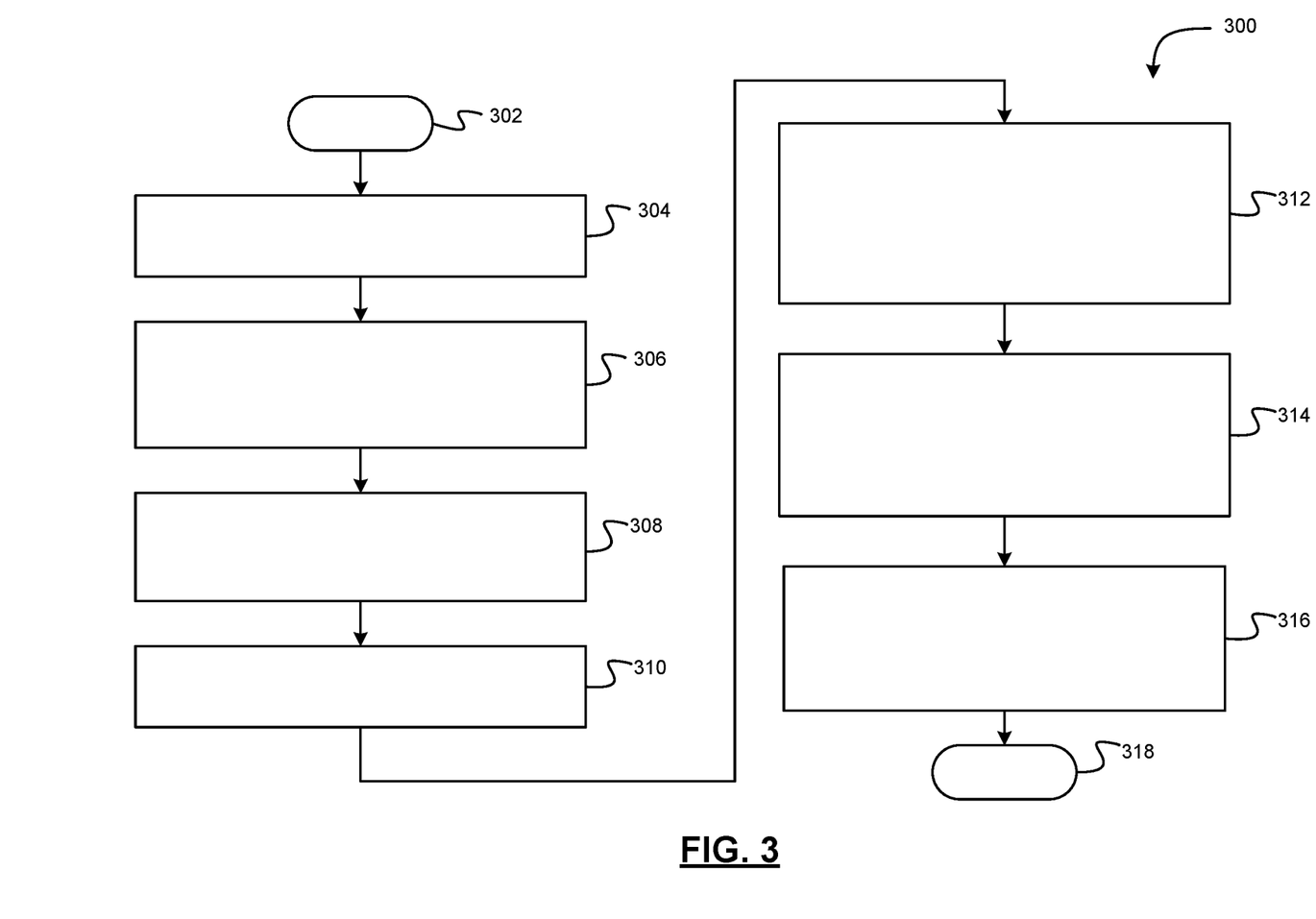
FIG. 3 is a flowchart representation of a periodic message transmission method that may be performed by an ECU including a periodic message transmission system in accordance with an embodiment.

Referring to FIG. 3, a flowchart representation of a periodic message transmission method 300 that may be performed by an ECU 102 including a periodic message transmission system 106 in accordance with an embodiment is shown. The method 300 will be described with reference to an example implementation of the periodic message transmission method 300. As can be appreciated in light of the disclosure, the order of operation within the method 300 is not limited to the sequential execution as illustrated in FIG. 3 but may be performed in one or more varying orders as applicable and in accordance with the present disclosure.

The method 300 begins at 302, when a vehicle is powered on and the periodic message transmission system 106 executes a software initialization phase. At 304, the operating system module 206 at the ECU 102 enables transmission of messages on a communication bus 104 during time ticks. Each successive time tick is separated by a time tick interval. For example, the time tick interval between successive time ticks may be 5 milliseconds.

At 306, the periodic message transmission system 106 identifies a plurality of periodic messages that are configured for transmission on the communication bus 104. Each periodic message is associated with a periodicity. Each periodicity is a multiple of the tick time interval. For example, the periodic message transmission system 106 may identify twelve periodic messages A, B, C, X, Y, Z, P, Q, U, V, H, K that are configured for transmission on the communication bus 104. Each periodic message A, B, C, X, Y, Z, P, Q, U, V, H, K may have an associated periodicity. For example, the periodic messages A, B, C may have a periodicity of 10 milliseconds, the periodic messages X, Y, Z may have a periodicity of 20 milliseconds, the periodic messages P, Q may have a periodicity of 25 milliseconds, the periodic messages U, V may have a periodicity of 50 milliseconds, and the periodic messages H, K may have a periodicity of 100 milliseconds. Each of the periodicities may be a multiple of 5 milliseconds, where 5 milliseconds is the tick time interval.

At 308, the periodic message transmission system 106 sorts the plurality of periodic messages by increasing periodicity to generate a sequence of periodic messages. For example, the periodic message transmission system 106 may sort the periodic messages A, B, C, X, Y, Z, P, Q, U, V, H, K by increasing periodicity to generate a sequence of periodic messages. Table 1 lists an example sequence of the periodic messages A, B, C, X, Y, Z, P, Q, U, V, H, K that may be generated by the periodic message transmission system 106 and the associated periodicities.

TABLE 1

Example Sequence of Periodic Messages
And Associated Periodicities

| Periodic Message | Periodicity (ms) | Periodic Message | Periodicity (ms) |
|---|---|---|---|
| A | 10 | P | 25 |
| B | 10 | Q | 25 |
| C | 10 | U | 50 |
| X | 20 | V | 50 |
| Y | 20 | H | 100 |
| Z | 20 | K | 100 |

At 310, the periodic message transmission system 106 assigns a zero-start-up delay to the first periodic message in the sequence of periodic messages. For example, the periodic message transmission system 106 may assign a zero-start-up delay to the first periodic message A in the sequence of periodic messages A, B, C, X, Y, Z, P, Q, U, V, H, K.

At 312, the periodic message transmission system 106 generates a start-up delay for each of the periodic messages remaining in the sequence of periodic messages based on a start-up delay of a previous periodic message in the sequence of periodic messages, the tick time interval, and the periodicity of that periodic message. In an embodiment, the periodic message transmission system 106 calculates the start-up delay for a periodic message by adding the start-up delay of a previous periodic message in the sequence of periodic messages to the tick time interval and then performing a module operation on the result using the periodicity of the periodic message. The modulo operation returns the remainder following the division of the sum of the start-up delay of the previous periodic message and the tick time interval by the periodicity of the periodic message. Table 2 lists an example sequence of the periodic messages A, B, C, X, Y, Z, P, Q, U, V, H, K, the associated periodicities, and the associated start-up delays that may be generated by the periodic message transmission system 106.

TABLE 2

Example of Periodic Messages,
Associated Periodicities and Start-Up Delays

| Periodic Message | Periodicity (ms) | Start-Up Delay (ms) |
|---|---|---|
| A | 10 | 0 |
| B | 10 | 5 |
| C | 10 | 0 |
| X | 20 | 5 |
| Y | 20 | 10 |
| Z | 20 | 15 |
| P | 25 | 20 |
| Q | 25 | 0 |
| U | 50 | 5 |
| V | 50 | 10 |
| H | 100 | 15 |
| K | 100 | 20 |

Table 2: Example of Periodic Messages, Associated Periodicities and Start-Up Delays As shown in Table 2, the periodic message transmission system 106 may assign a zero-start-up delay to the first periodic message A. The periodic message transmission system 106 may for example calculate the start-up delay for the periodic message B by adding the start-up delay of zero of the previous periodic message A to the time tick interval of 5 milliseconds to generate a sum of 5 milliseconds. The periodic message transmission system 106 may apply the modulo operation by dividing the sum of 5 milliseconds by the periodicity of 10 milliseconds of the periodic message B to generate a remainder of 5 milliseconds. The periodic message transmission system 106 assigns a start-up delay of 5 milliseconds to the periodic message B.

In another example, the periodic message transmission system 106 may calculate the start-up delay for the periodic message C by adding the start-up delay of 5 milliseconds of the previous periodic message B to the time tick interval of 5 milliseconds to generate a sum of 10 milliseconds. The periodic message transmission system 106 may apply the modulo operation by dividing the sum of 10 milliseconds by the periodicity of 10 milliseconds of the periodic message B to generate a remainder of 0 milliseconds. The periodic message transmission system 106 may assign a start-up delay of 0 milliseconds to the periodic message C.

In another example, the periodic message transmission system 106 may calculate the start-up delay for the periodic message X by adding the start-up delay of 0 milliseconds of the previous periodic message C to the time tick interval of 5 milliseconds to generate a sum of 5 milliseconds. The periodic message transmission system 106 may apply the modulo operation by dividing the sum of 5 milliseconds by the periodicity of 20 milliseconds of the periodic message X to generate a remainder of 5 milliseconds. The periodic message transmission system 106 may assign a start-up delay of 5 milliseconds to the periodic message X. The periodic message transmission system 106 may calculate the start-up delays for each of the remaining periodic messages Y, Z, P, Q, U, V, H, K having the values shown in Table 2 in a similar manner.

At 314, the periodic message transmission system 106 generates a transmission schedule for the periodic messages in the sequence of periodic messages in accordance with the start-up delay and the periodicity associated with each of the periodic messages. Table 3 lists an example transmission schedule for the periodic messages A, B, C, X, Y, Z, P, Q, U, V, H, K in the sequence of periodic messages in accordance with the start-up delay and the periodicity associated with each of the periodic messages.

TABLE 3

Example of Transmission Schedule

| Time Tick (ms) | Periodic Message |
|---|---|
| 0 | A C Q |
| 5 | B X U |
| 10 | A C Y V |
| 15 | B Z H |
| 20 | A C P K |
| 25 | B X Q |
| 30 | A C Y |
| 35 | B Z |
| 40 | A C |
| 45 | B X P |
| 50 | A C Y Q |
| 55 | B Z U |
| 60 | A C V |
| 65 | B X |
| 70 | A C Y P |
| 75 | B Z Q |
| 80 | A C |
| 85 | B X |
| 90 | A C Y |
| 95 | B Z P |
| 100 | A C Q |
| 105 | B X U |
| 110 | A C Y V |

At 316, the periodic message transmission system 106 coordinates the transmission of the periodic messages in the sequence of periodic messages onto the communication bus 104 in accordance with the transmission schedule. For example, the periodic message transmission system 106 may coordinate the transmission of periodic messages A, B, C, X, Y, Z, P, Q, U, V, H, K in the sequence of periodic messages onto the communication bus 104 in accordance with the transmission schedule shown in Table 3. Thereafter, the method 300 may end at 318.

In an embodiment, the periodic message transmission system 106 may generate the transmission schedule during a software initialization phase using the pseudo code shown below. The generation of the transmission schedule may employ operations 304-314 of method 300.

Pseudo-code
Algorithm #1: Initialization (Tick Time Interval=5 milliseconds)
Declare an empty message list MsgList;
For each transmission message Msg:
  If Msg is non-periodic (i.e. event-triggered)
  Msg.Periodicity=0;
  Else
  Msg.Periodicity=predefined periodicity of this message in milliseconds;
  EndIf
  Msg.StartupDelay=0;
  Msg.TxTimer=0;
  MsgList.add(Msg);
EndFor
SortMsgsByPeriodicity(MsgList);
For each Msg in MsgList:
  If Msg.Periodity is zero (i.e. event-triggered)
  Msg.StartupDelay=0 ms;
  Else If it's the very first periodic Msg
  Msg.StartupDelay=0 ms;
  Startup Delay Previous=0 ms;
  Else
  Msg.StartupDelay=(Startup Delay Previous+5 ms) % Msg.Periodicity;
  Startup Delay Previous=Msg. StartupDelay
  EndIf
EndFor In an embodiment, the periodic message transmission system 106 may transmit the plurality of periodic messages onto the communication bus 104 in accordance with the transmission schedule during a run time phase using the pseudo code shown below. The transmission of the plurality of periodic messages onto the communication bus 104 in accordance with the transmission schedule may employ operation 316 of method 300.

Pseudo-code
Algorithm #2: runtime (Tick Time Interval=5 milliseconds)
In 5 ms OS task
  For each Msg in MsgList:
    If Msg. StartupDelay==0
      Msg.TxTimer 5 ms;
      If Msg.TxTimer>=Msg.Periodicity
        Transmit Msg;
        Msg.TxTimer=0ms;
      EndIf
    Else
      Msg.StartupDelay -=5 ms;
    EndIf
  EndFor
End 5 ms OS task Employing a periodic message transmission system 106 to schedule the transmission of periodic messages from an ECU 102 on a communication bus 104 may generate an improved transmission schedule that may reduce central processing unit (CPU) throughput at the ECU 102 and may balance communication bus load on the communication bus 104. The use of the periodic message transmission system 106 may reduce CPU spikes that could potentially lead to OS task overrun as well as reduce the introduction of unexpected delays and timing jitters for other messages on the communication bus 104.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for scheduling periodic message transmission comprising:
    a processor configured to be communicatively coupled to a communication bus; and
    a memory, the memory comprising instructions that upon execution by the processor, cause the processor to:

enable transmission of messages on the communication bus during time ticks, wherein each successive time tick is separated by a tick time interval;

identify a plurality of periodic messages configured to be transmitted on the communication bus wherein, each of the plurality of periodic messages is associated with a periodicity, the periodicity being a multiple of the tick time interval;

sort the plurality of periodic messages by increasing periodicities to generate a sequence of periodic messages;

assign a zero-start-up delay to a first periodic message in the sequence of periodic messages;

generate a start-up delay for each periodic message in the sequence of periodic messages based on a previous start-up delay associated with a previous periodic message, the tick time interval, and a periodicity of that periodic message; and generate a transmission schedule for the plurality of periodic messages in accordance with the start-up delay and the periodicity associated with each of the plurality of periodic messages.

2. The system of claim 1, wherein the memory comprises further instructions that upon execution by the processor, cause the processor to generate the transmission schedule during a software initialization phase.

3. The system of claim 1, wherein the memory comprises further instructions that upon execution by the processor, cause the processor to transmit the plurality of periodic messages onto the communication bus in accordance with the transmission schedule.

4. The system of claim 1, wherein the memory comprises further instructions that upon execution by the processor, cause the processor to transmit the plurality of periodic messages onto the communication bus in accordance with the transmission schedule during a run time phase.

5. The system of claim 1, wherein the memory comprises further instructions that upon execution by the processor, cause the processor to:

identify a second periodic message having a first priority scheduled for transmission during a first time tick;

identify a third periodic message having a second priority scheduled for transmission during the first time tick, the second priority being lower than the first priority; and transmit the second periodic message prior to the third periodic message during the first time tick.

6. The system of claim 1, wherein the processor is configured to be communicatively coupled to one of a control area network (CAN) communication bus and an automotive ethernet communication bus.

7. The system of claim 1, wherein the memory comprises further instructions that upon execution by the processor, cause the processor to transmit a trigger event message generated in response to a trigger event during a first time tick following the trigger event.

8. The system of claim 1, wherein the memory comprises further instructions that upon execution by the processor, cause the processor to transmit the plurality of periodic messages to at least one electronic controller unit (ECU) in a vehicle via the communication bus.

9. The system of claim 1, wherein the memory comprises further instructions that upon execution by the processor, cause the processor to:

identify a first start-up delay associated with a second periodic message in the sequence of periodic messages;

generate a sum of the first start-up delay and the tick time interval;

apply a modulo operation to the sum by dividing the sum by a periodicity of a third periodic message following the second periodic message in the sequence of periodic messages to generate a remainder; and assign the remainder as a second start-up delay to the third periodic message.

10. A method for scheduling periodic message transmission comprising:

enabling transmission of messages on a communication bus from a controller at a vehicle during time ticks, wherein each successive time tick is separated by a tick time interval;

identifying a plurality of periodic messages configured to be transmitted on the communication bus at the controller wherein, each of the plurality of periodic messages is associated with a periodicity, the periodicity being a multiple of the tick time interval;

sorting the plurality of periodic messages by increasing periodicities to generate a sequence of periodic messages at the controller;

assigning a zero-start-up delay to a first periodic message in the sequence of periodic messages at the controller;

generating a start-up delay for each periodic message in the sequence of periodic messages based on a previous start-up delay associated with a previous periodic message, the tick time interval, and the periodicity of that periodic message at the controller; and generating a transmission schedule for the plurality of periodic messages in accordance with the start-up delay and the periodicity associated with each of the plurality of periodic messages at the controller.

11. The method of claim 10, further comprising generating the transmission schedule for the plurality of periodic messages during a software initialization phase at the controller.

12. The method of claim 10, further comprising transmitting the plurality of periodic messages from the controller via the communication bus in accordance with the transmission schedule.

13. The method of claim 10, further comprising transmitting each of the plurality of periodic messages from the controller via the communication bus in accordance with the transmission schedule during a run time phase.

14. The method of claim 10, further comprising:

identifying a second periodic message having a first priority scheduled for transmission during a first time tick at the controller;

identifying a third periodic message having a second priority scheduled for transmission during the first time tick at the controller, the second priority being lower than the first priority; and transmitting the second periodic message prior to the third periodic message from the controller during the first time tick.

15. The method of claim 10, wherein transmitting messages on the communication bus from the controller comprises further comprising transmitting messages on one of a control area network (CAN) communication bus and an automotive ethernet communication bus.

16. The method of claim 10, further comprising transmitting a trigger event message generated in response to a trigger event during a first time tick following the trigger event from the controller.

17. The method of claim 10, further comprises transmitting the plurality of periodic messages from the controller to at least one electronic controller unit (ECU) in the vehicle via the communication bus.

18. The method of claim 10, further comprising:
identifying a first start-up delay associated with a second periodic message in the sequence of periodic messages;
generating a sum of the first start-up delay and the tick time interval;
applying a modulo operation to the sum by dividing the sum by a periodicity of a third periodic message following the second periodic message in the sequence of periodic messages to generate a remainder; and
assigning the remainder as a second start-up delay to the third periodic message.

19. A vehicle including a system for scheduling periodic message transmission comprising:
a processor configured to be communicatively coupled to a communication bus; and
a memory, the memory comprising instructions that upon execution by the processor, cause the processor to:
enable transmission of messages on the communication bus during time ticks, wherein each successive time tick is separated by a tick time interval;
identify a plurality of periodic messages configured to be transmitted on the communication bus wherein, each of the plurality of periodic messages is associated with a periodicity, the periodicity being a multiple of the tick time interval;
sort the plurality of periodic messages by increasing periodicities to generate a sequence of periodic messages;
assign a zero-start-up delay to a first periodic message in the sequence of periodic messages;
generate a start-up delay for each periodic message in the sequence of periodic messages based on a previous start-up delay associated with a previous periodic message, the tick time interval, and a periodicity of that periodic message; and
generate a transmission schedule for the plurality of periodic messages in accordance with the start-up delay and the periodicity associated with each of the plurality of periodic messages.

20. The vehicle of claim 19, wherein the memory comprises further instructions that upon execution by the processor, cause the processor to:
identify a first start-up delay associated with a second periodic message in the sequence of periodic messages;
generate a sum of the first start-up delay and the tick time interval;
apply a modulo operation to the sum by dividing the sum by a periodicity of a third periodic message following the second periodic message in the sequence of periodic messages to generate a remainder; and
assign the remainder as a second start-up delay to the third periodic message.

* * * * *